(12) United States Patent
Delmoro et al.

(10) Patent No.: US 6,988,397 B1
(45) Date of Patent: Jan. 24, 2006

(54) RIM CHUCKING MACHINE

(75) Inventors: Richard L. Delmoro, Tallmadge, OH (US); David P. Krause, Hartville, OH (US)

(73) Assignee: Akron Special Machinery, Inc., Akron, OH (US)

( * ) Notice: Subject to any disclaimer, the term of this patent is extended or adjusted under 35 U.S.C. 154(b) by 64 days.

(21) Appl. No.: 10/361,944

(22) Filed: Feb. 11, 2003

(51) Int. Cl.
G01M 17/02 (2006.01)

(52) U.S. Cl. ............................ 73/146; 157/16

(58) Field of Classification Search ............ 73/146, 73/8; 157/16, 17, 18; 361/234; 279/50; 340/442, 443, 444
See application file for complete search history.

(56) References Cited

U.S. PATENT DOCUMENTS

| | | | |
|---|---|---|---|
| 4,034,786 A * | 7/1977 | Feldmann et al. ............ 157/18 |
| 4,971,128 A * | 11/1990 | Koga et al. .................... 127/21 |
| 5,033,003 A * | 7/1991 | Lees, Sr. ..................... 701/124 |
| 5,562,358 A * | 10/1996 | Okamoto et al. ........... 403/371 |
| 5,719,331 A * | 2/1998 | Delmoro ....................... 73/146 |
| 6,089,084 A * | 7/2000 | Nishihara et al. ............. 73/146 |
| 6,244,105 B1 * | 6/2001 | Nishihara et al. ............. 73/146 |
| 6,308,566 B1 * | 10/2001 | Matsumoto et al. .......... 73/462 |
| 6,481,281 B1 * | 11/2002 | Gerdes ......................... 73/460 |
| 6,502,834 B1 * | 1/2003 | Fukui et al. ................ 279/2.04 |
| 6,611,418 B2 * | 8/2003 | Mazlout et al. ............. 361/234 |
| 2002/0124650 A1 * | 9/2002 | Matsumoto .................. 73/460 |
| 2002/0145261 A1 * | 10/2002 | Humphrey et al. ........... 279/50 |

* cited by examiner

Primary Examiner—Edward Lefkowitz
Assistant Examiner—Andre Allen
(74) Attorney, Agent, or Firm—Renner, Kenner, Greive, Bobak, Taylor & Weber (57) ABSTRACT

A tire uniformity machine for testing a wheel that includes a tire mounted on a rim having a central bore, the tire uniformity machine including a frame defining a machine proper for receiving the reel, a chuck assembly adapted to hold the wheel during testing, the chuck assembly including a protuberance insertably received within the central bore.

7 Claims, 7 Drawing Sheets

RIM CHUCKING MACHINE

RELATED PATENT APPLICATIONS

None.

FIELD OF THE INVENTION

In general, the present invention relates to tire uniformity machines. More particularly, the present invention relates to a rim chucking tire uniformity machine. Most particularly, the present invention relates to the conveying assembly and chucking assembly in a rim chucking tire uniformity machine.

BACKGROUND OF THE INVENTION

Generally, tire uniformity machines are used to test characteristics of tires after production. The testing may include measurement of the dimensional characteristics of the tire and the forces on the tire at varying loads. To accomplish load testing, the tire is brought into the tire uniformity machine, mounted on a chuck, inflated and rotated by a tire assembly coupled to the spindle of the chuck while a loadwheel is brought into contact with the periphery of the tire.

In existing tire uniformity machines, the tire is tested without being mounted on a rim. In this way, the chucking assembly of the tire uniformity machine is suitably sized to fill the generally cylindrical bore extending axially between the bead rings of the tire. Since the tire is inflated during testing, an airtight seal must be created between the tire and the chuck assembly. Typically, the chuck assembly is divided into upper and lower portions which converge at the tire to clamp the tire therebetween. Once the tire is clamped, it is inflated by air delivered through the chuck assembly and, then, rotated on the chuck assembly. To that end, one of the halves of the chuck is mounted on a driven spindle with the other being mounted on suitable bearings such that it may rotate with the driven half. Typically, the undriven half is moveable in the axial direction to raise or lower the tire to a testing position. After the tire is placed in the testing position, the spindle is rotated causing the tire to rotate at a selected speed. Once spindle rotation has started, a loadwheel is advanced radially to press against the tire until a desired loading is achieved and, at that point, test data is taken from load cells associated with the loadwheel. Once testing is completed, loadwheel retracts and the rotating spindle is stopped. The chuck halves are retracted to release the tire from the chuck assembly and lower the tire to the conveyor. Once the chuck assembly has cleared the tire, the conveyor may be activated to transport the tested tire from the tire uniformity machine.

SUMMARY OF THE INVENTION

It is an object of the present invention to provide an improved tire uniformity machine. Another object of the present invention is to provide a tire uniformity machine capable of testing a tire mounted on a rim. It is yet another object of the present invention to provide a tire uniformity machine having a rim chucking assembly. It is still another object of the present invention is to provide a tire uniformity machine having a rim chucking assembly with an expandable head capable of mounting rims having various sized bores.

It is yet a further object of the present invention to provide a tire uniformity machine having a conveyor assembly that transports a tire and rim assembly into the tire uniformity machine. It is yet another object of the present invention to provide a conveyor assembly having a center conveyor assembly having a center conveyor located within the tire uniformity machine adapted to move axially to locate the tire and rim assembly on a chuck assembly.

In light of at least one of the foregoing objects, the present invention generally provides a tire uniformity machine for testing a wheel that includes a tire mounted on the rim having a central bore, the tire uniformity machine including a frame defining a machine proper for receiving the wheel, a chuck assembly adapted to hold the wheel during testing, the chuck assembly including a protuberance insertably received within the central bore, wherein a portion of the protuberance is adapted to expand radially outwardly within the central bore to fix the rim to the chuck assembly.

The present invention further provides a chuck assembly in a tire uniformity machine for testing a wheel that includes a tire mounted on a rim having a central bore, the chuck assembly including a first chuck element and a second chuck element coaxially aligned and selectively moveable in the axial direction, each of the elements having opposed shoulders to clamp the rim therebetween, and a protuberance formed on one of the chuck elements and a protuberance receiving bore formed in the other of the chuck elements, the protuberance extending axially outward from a central portion of the one of the chuck elements beyond a radially extending plane of the shoulder of the one of the chuck elements, where the protuberance is sized to fit through the center bore of the rim.

The present invention further provides a tire uniformity machine for testing a wheel, the wheel having a tire mounted on a rim, where the rim has a central bore, the tire uniformity machine including a frame defining a machine proper in which the wheel is tested, and chucking assembly located within the machine proper adapted to hold the wheel during testing, a first and second conveyor located on opposite sides of the machine proper, a third conveyor at least partially located within the machine, the third conveyor being in registry with the first and second conveyors and the chuck assembly, and wherein the third conveyor is moveable in a direction parallel to the axis of the chuck assembly, whereby the third conveyor is selectively moved axially upon receipt of a wheel from either of the first and second conveyors to seat the wheel from either of the first and second conveyors to seat the wheel on the assembly.

DETAILED DESCRIPTION OF THE INVENTION

A tire uniformity machine is shown in the drawings and generally indicated by the numeral 10. Tire uniformity machine 10 generally includes a plurality of column-like vertical side frame members 11, a top frame member 12, and a lower frame member 13 to form a box-like framework F. The framework F defines an open space within the frame members 11, 12, and 13, which will be referred to as the machine proper and generally indicated by the numeral 14, within which a tire T is received and tested.

Tire T may be delivered into the machine proper 14 and removed therefrom, after testing, by a conveyor assembly, generally indicated by the numeral 15. An entrance portion, generally indicated by the numeral 16 of conveyor assembly 15 includes a conveying member, for example, an infinite belt or rollers 18, as shown, which is driven by a motor 19 to deliver the tire T to the machine proper 14. An alignment assembly, generally indicated by the numeral 20, may be provided to center the tire relative to the machine proper 14 to ensure proper mounting of the tire T, as will be described more completely below. The centering assembly 20 may include a pair of arms 21 located on either side of the entrance conveyor 16 having inwardly extending legs 22 that support rollers 23. Rollers 23 are rotatable and have a generally vertical axis such that rollers 23 are capable of exerting a radial force to center the tire T without impeding the progress of the tire toward the machine proper 14.

Figure 5:
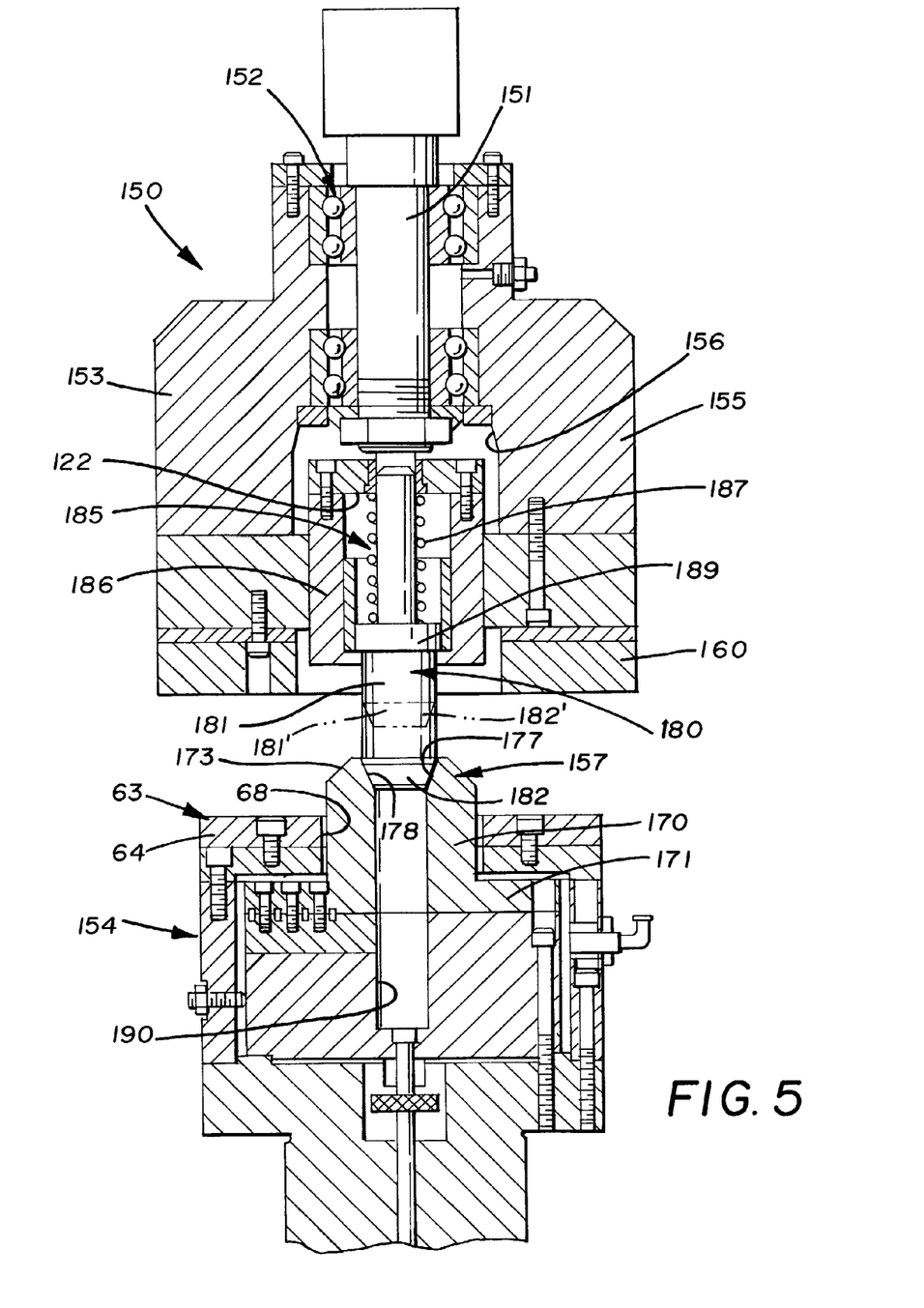
FIG. 5 is an enlarged partially sectioned view similar to FIG. 4 depicting a second embodiment of a chucking assembly according to the concepts of the present invention.

A position sensor, generally indicated by the numeral 25, may be located adjacent the entrance conveyor 16 to monitor the entrance of the tire T into the machine proper 14. It will be appreciated that any number of commercially available sensors may be used to detect the presence of the tire T at the entrance conveyor 16 including, for example, a photo-eye. Sensor 25 may be connected to a suitable programmable controller, generally indicated by the letter C, to monitor the status at sensor 25 and/or perform additional functions based on the sensor status. In the embodiment shown, upon detecting the presence of a tire T at sensor 25, controller C stops the entrance conveyor 16. A machine operator may then selectively activate the machine to begin an automatic tire testing process. It will be appreciated that this input from the operator is optional and the tire uniformity machine 10 and conveyor assembly 15 may be operated in an automated fashion. Once the entrance conveyor 16 is reactivated, the tire and rim assembly T moves through the auto-centering mechanism 20 and proceeds toward the machine proper 14. A second sensor, generally indicated by the numeral 28, detects the entrance of the tire and rim assembly T into the machine proper 14 and communicates this information to the controller C to begin a timer that records the conveyor run time necessary to stop the tire and rim assembly T above a chuck assembly, described below. As the tire and rim assembly T enter the machine proper 14, the tire and rim assembly T is handed off from the entrance conveyor 16 to a center conveyor assembly, generally indicated by the numeral 30. As the tire and rim assembly T enters the machine proper 14, the center conveyor assembly 30 is generally located at a vertical position (30') substantially equal to that of the entrance conveyor 16 (FIG. 5). In this way, the tire and rim assembly T travel along a generally linear horizontal path as the tire and rim assembly T enter the machine proper 14.

Center conveyor assembly 30 is made movable in the vertical direction such that it may be raised or lowered, as necessary, to position the tire and rim assembly T on a chuck assembly, generally indicated by the numeral 50. To that end, center conveyor assembly 30 includes actuators, generally indicated by the numeral 31, which, as shown, for example, may be pneumatic cylinders, used to raise and lower the center conveyor assembly 30, as necessary, during the operation of the tire uniformity machine 10. It will be appreciated that other actuators suitable for raising and lowering the center conveyor assembly 30 may be substituted. In the embodiment shown, actuator 31 may be connected to the frame 32 of center conveyor 30, as by a linkage 33, which pivotally attaches to laterally extending cross members 34 located at either end of the center conveyor 30. As shown, actuators 31 may be supported on the frame F of the tire uniformity machine 10. In the example shown, a pair of mounting brackets 35 are provided to support actuators 35 at either end of center conveyor assembly 30. Mounting brackets 35 may be attached, as by welds, to the lower frame member 13 and a spindle support member 36, which will be described more completely below.

Center conveyor 30 further includes a carrier, for example, one or more conveyor belts 37 that are laterally spaced to expose the central portion of the tire and rim assembly T for chucking purposes while supporting the tire and rim T thereon. The belts 37 are operatively interconnected with a second motor assembly, generally indicated by the numeral 39, as by a drive belt 41 which connects to a rotatable belt carrier 42 at one end of the center conveyor 30. It will be appreciated that rollers, wheels and other carriers may be substituted for belts 37. Belts 37 provide one example of a carrier.

First and second proximity switches 45, 46 are associated with the center conveyor 30 to communicate the position status of the center conveyor 30 to the process controller C. In the embodiment shown, first proximity switch 45 indicates the presence of the center conveyor 30 in a lowered condition and second proximity switch 46 indicates presence of the center conveyor 30 in a raised condition. Any number of commercially available proximity switches are suitable for this purpose and, thus, these structures will be referred to in a generic manner and indicated similarly in the drawings. A solenoid valve, generally indicated by the numeral 48, is associated with the actuator 31 and process controller C, such that, upon receiving a signal from the process controller C, solenoid valve 48 is activated to cause actuators 31 to raise or lower the center conveyor 30, as necessary to position the tire and rim assembly T on a chuck assembly, generally indicated by the numeral 50.

Figure 1:
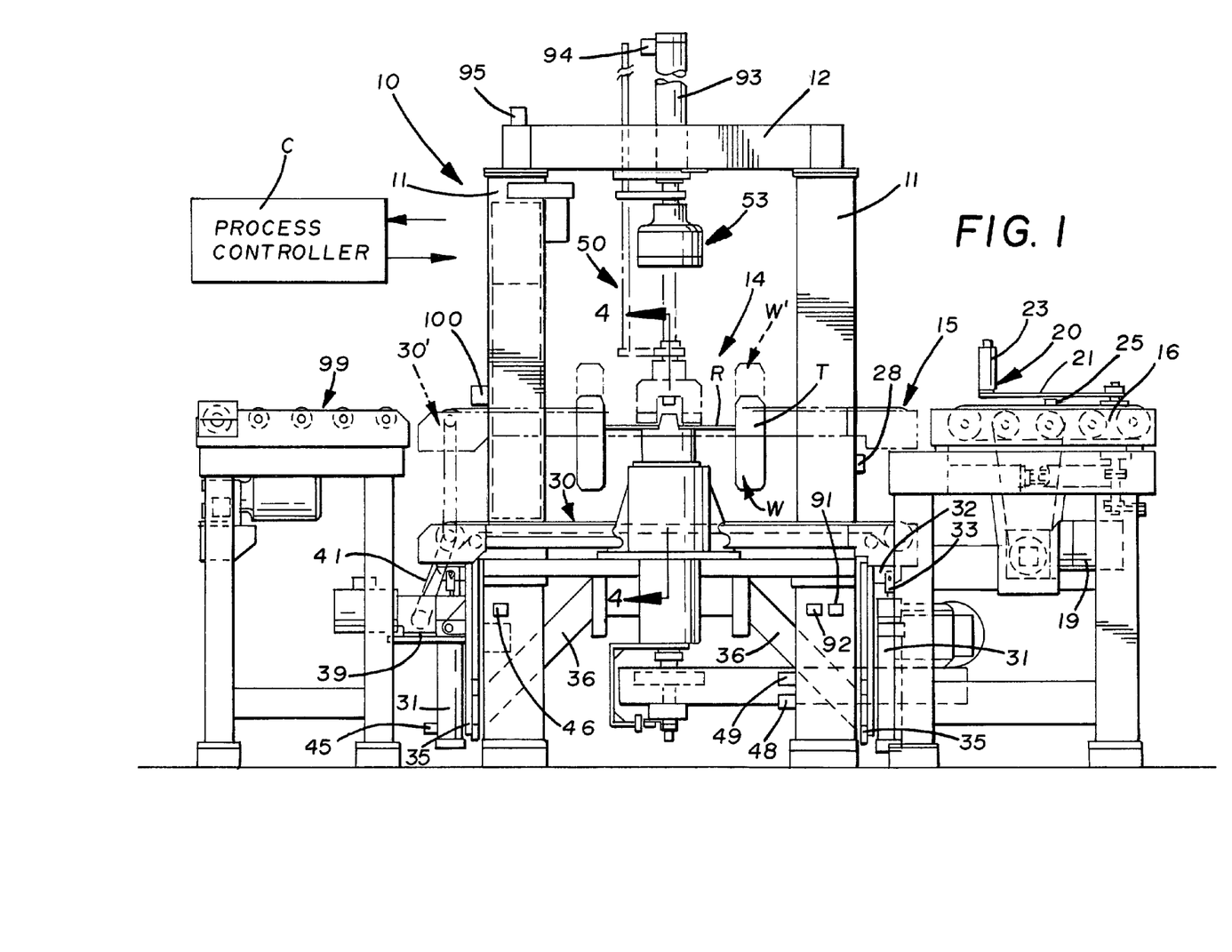
FIG. 1 is a side elevational view of a tire uniformity machine according to the concepts of the present invention depicting a tire mounted on a chuck assembly within the machine the proper, the tire and chuck assembly being partially sectioned to depict details thereof.
Figure 2:
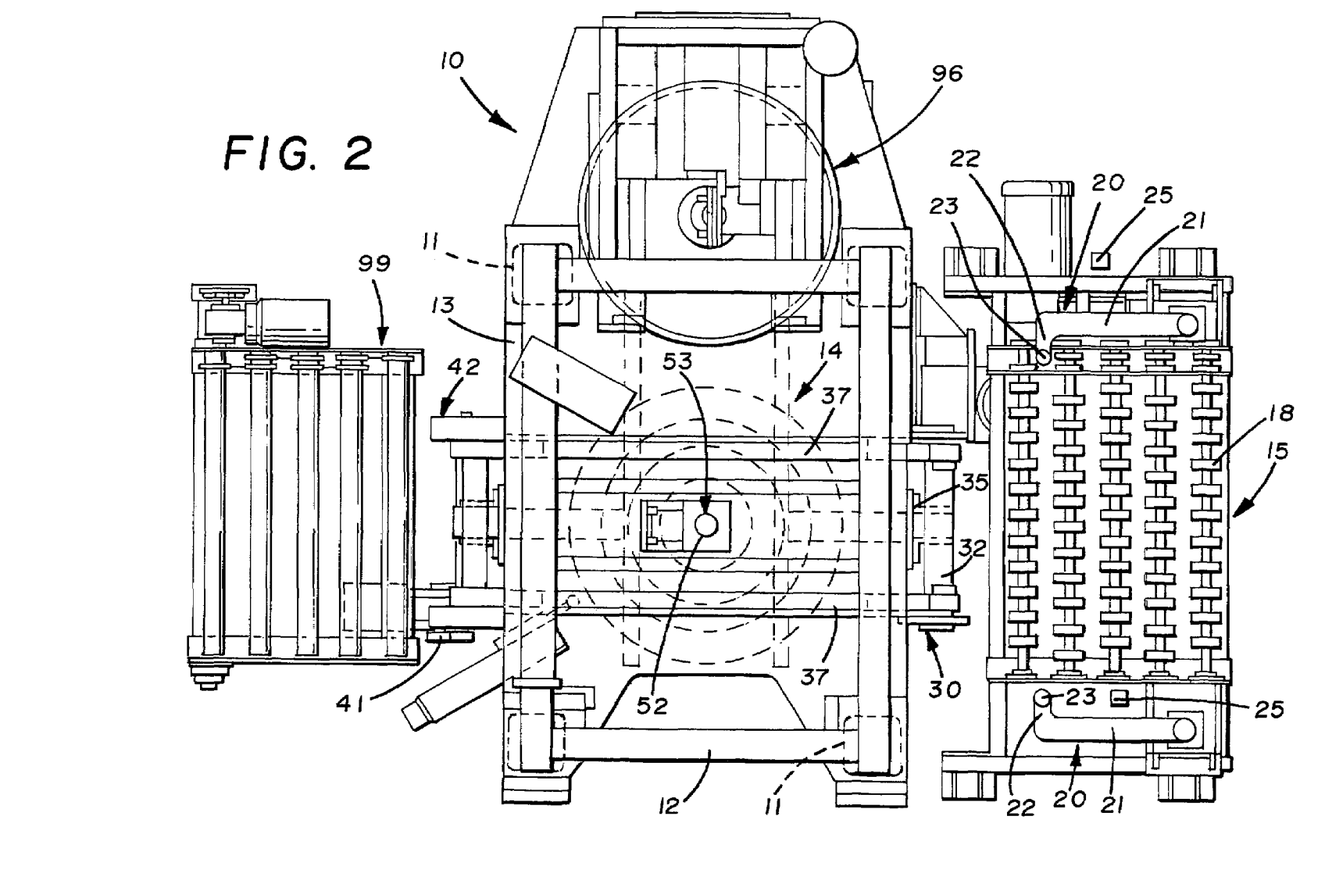
FIG. 2 is a top elevational view of a tire uniformity machine according to the concepts of the present invention.
Figure 3:
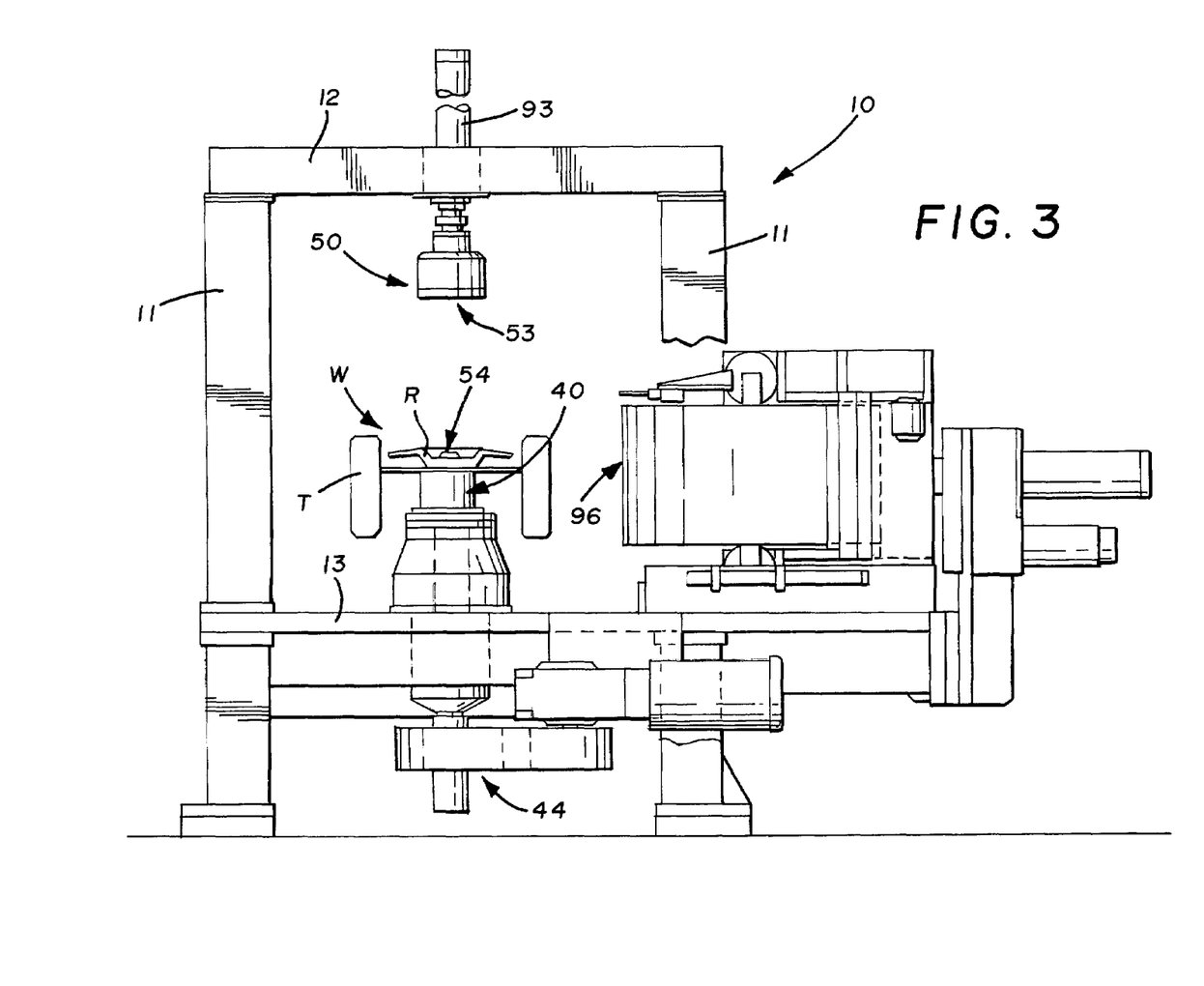
FIG. 3 is front elevational view of the tire uniformity machine.

As best shown in FIG. 2, chuck assembly 50 may be centrally located within the machine proper 14 and laterally centered with respect to the center conveyor 30. As previously mentioned, the conveyor belts 37 are suitably spaced to provide a clearance at 52 for chuck assembly 50 allowing the chuck assembly 50 to extend through clearance 52 into the plane defined by the tire and rim assembly.

Chuck assembly 50 may include a first chucking element 53 and a second chucking element 54, which are axially aligned with each other along a central axis corresponding to the axis of the spindle 40. Once the wheel W is chucked, the spindle 40 may be caused to rotate, as by a drive unit 44, for example, a motor and belt assembly as shown. While the chuck assembly 50 is shown as having the second chuck element 54 driven by drive unit 44, the first chuck element 53 may be driven to the same effect.

Figure 4:
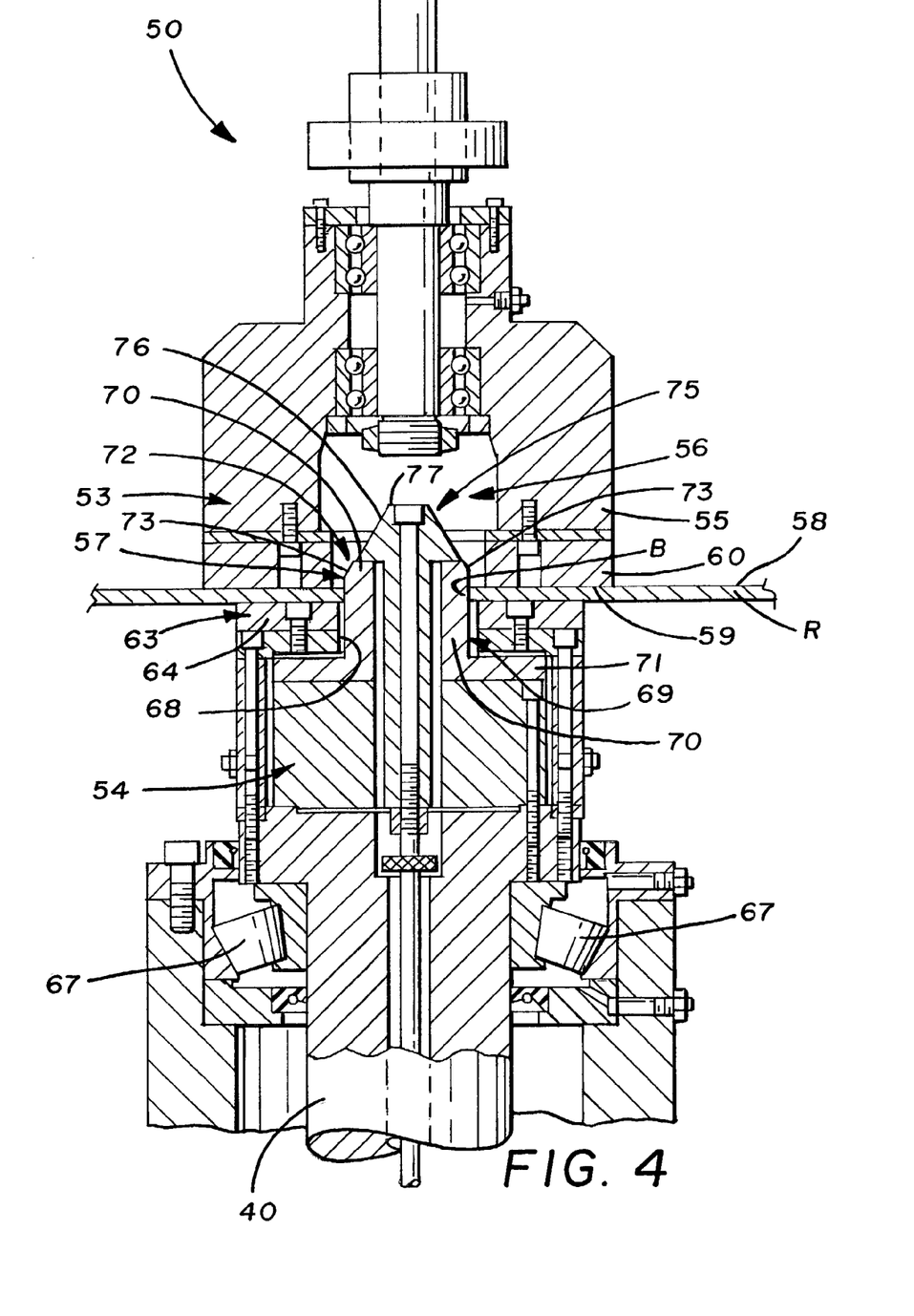
FIG. 4 is an enlarged partially sectioned view as might be seen along line 4—4 in FIG. 1 of a first embodiment of a chucking assembly according to the concepts of the present invention.

In a first embodiment of the chucking assembly, depicted in FIG. 4, the first chuck element 53 has a generally annular first chuck head 55 defining a central bore 56 adapted to receive a protuberance 57 on the second chuck assembly 54. First chuck assembly 53 may contact a first surface 58 of the tire and rim assembly at its end 59. To protect the finish on the rim R, first chuck assembly 53 may be provided with a pad 60 at the end 59.

The second chuck element 54 has a protuberance 57 adapted to protrude through the center bore B of the rim R and align the rim R on the chuck assembly 50. As mentioned, the protuberance 57 extends axially upward through the bore B and into the bore 56 of the first chuck element 53. A radially extending shoulder, generally indicated by the numeral 63 extends radially outward relative to the protuberance 57 and is generally located adjacent thereto, as best shown in FIG. 4. Shoulder 63, like end 59 may be provided with a pad 64. The rim R may then be clamped between the pads 60 and 64 in preparation for testing of the tire T.

Second chuck element 54 is rotatable about the spindle axis and may be mounted on thrust bearings 67 to resist axial loads transmitted through the spindle 40. The protuberance 57 is supported on second chuck element 54 and extends through a bore 68 defined by the annular shoulder 63. As shown in FIG. 4, a clearance 69 may be provided adjacent the protuberance 57 to allow expansion thereof.

The protuberance includes a cylindrical body 70 that extends axially outward from an annular base 71 that extends radially subjacent to the shoulder portion 63 of the second chuck element 54. At the axial extremity opposite the base 71, body 70 is provided with an inwardly tapering end 72 having a sloped shoulder surface 73 that facilitates location of the rim bore B when mounting the rim R on the chuck assembly 50. To further facilitate such location, a cone assembly, generally indicated by the numeral 75, may be fit over the end 72 of the protuberance 57. Like shoulder 73, the outer surface 76 of cone 75 tapers inwardly in the axial outward direction relative to the base 71 of the protuberance 57. The tip 77 of the cone 75 may be truncated such that the cone 75 has a trapezoidal cross-section, as depicted for example in FIG. 4. The tip 77 has a smaller diameter than the bore B making it possible for the tip 77 to extend through the bore B even if the bore B is not initially centered over the protuberance 57. As the rim R is lowered onto the second element 54, the surfaces 76, 73 act to guide the rim R such that the bore B is located coaxially with the protuberance 57.

The protuberance 57 is sized to closely fit the bore B to prevent any eccentric movement of the rim R, which may be caused by misalignment or movement of the rim relative to the protuberance 57.

Once the rim R is properly located and clamped on the chuck assembly 50, testing may be performed in a manner well known in the art. Once testing is completed, the center conveyor 30 may be raised to lift the wheel W off of the chuck assembly 50 and the conveyor belt 37 then activated to transport the tested wheel to the exit conveyor 99 located downstream of the tire uniformity machine 10.

FIG. 5 depicts an alternative embodiment of the chuck assembly 50, which will be generally referred to as the second embodiment and indicated by the numeral 150 in the accompanying drawings. Since the second embodiment 150 shares structure with the first embodiment 50, like numbers will be used to refer to like parts. Chuck assembly 150 includes a first chuck element 153 that is supported on an inner tube 151 and made freely rotatable thereon, as by suitable bearings, generally indicated by the numeral 152. First element 153 includes a spreading assembly, generally indicated by the numeral 180 and described in more detail below.

In contrast to the first embodiment, the second chuck element 154 does not include the cone assembly 75. A recess 177 is formed centrally within the end 172 of protuberance body 170. The recess 177 has a wall 178 that tapers inwardly away from the first element 153. The spreading assembly 180 includes a driver 181 having a similarly tapered end 182 that is driven into the recess 177 to spread the end 173 of the body 170 radially outward to ensure a snug fit with the bore B of the rim R. Driver 181 is retractable and may be disengaged from the recess 177 to release the rim R. The retracted position of the driver 181 is shown in broken lines and the tapered end is indicated by the numeral 182'. To advance and retract the driver 181, a biasing assembly, generally indicated by the numeral 185 is located within the bore 156 of the first chuck element 153. The biasing assembly 185 may include, as shown, a housing 186 within which a spring 187 is located. Spring 187 is compressed between a surface 188 of the housing 186 and a radially extending flange 189 formed on the end 181 of the spreading assembly 180. The spring 187 urges the driver 181 toward recess 177, such that, the driver 181 is naturally urged toward the engaged position (solid line) spreading the end 173 of body 170 to hold the rim R fast. To release the protuberance 157 from the rim R, the driver 181 may be retracted, as by a mechanical element or fluid pressure. For example, air delivered upwardly through passage 190 may be used to release the driver 181 from the recess 177.

Figure 6:
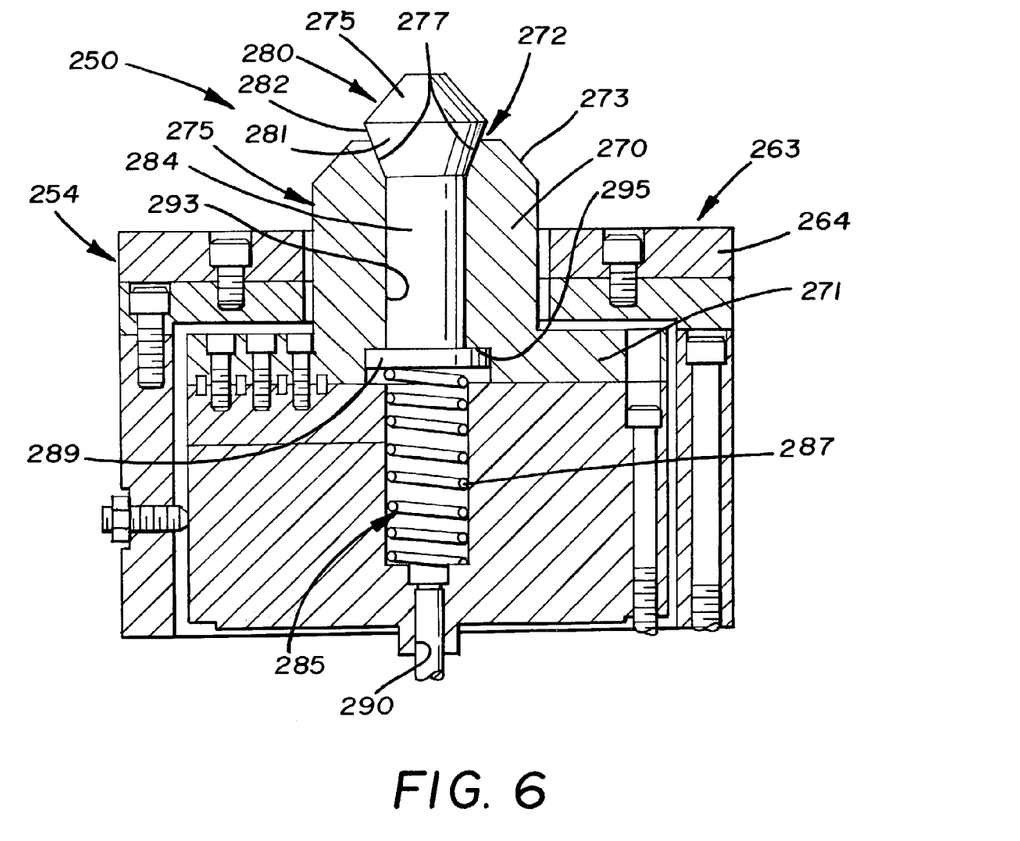
FIG. 6 is an enlarged partially sectioned elevational view similar to FIG. 4 depicting details of a third embodiment of a chucking assembly according to the concepts of the present invention.

In a third alternative embodiment, of a chuck assembly, generally indicated by the numeral 250, includes a spreading assembly, generally indicated by the numeral 280 located on the second chuck element 254. As in the second embodiment, like numerals will be used to refer to like parts from the previous embodiments. In FIG. 6, the second chuck element 253 is shown. Second chuck element 254 carries a protuberance 257 having a generally cylindrical body 270 extending axially outward from a base 271 beyond the plane of the second chuck element shoulder 263. The axial extremity or end 272 opposite base 271 has a tapered shoulder 273 that facilitates location of the rim R on the second chuck element 254. A cone assembly 275 is provided adjacent the end 272 of the protuberance 257 to further facilitate locating the rim R on the protuberance 257. In the embodiment depicted in FIG. 6, the cone assembly 275 is located on an integral spreading assembly 280 seated within a bore 293 defined within the body 270. The spreading assembly 280 includes a driver 281 having a surface that tapers inward toward the base 271 of the protuberance 257. The end 272 of the protuberance is provided with a similarly tapered inner surface 277, such that, as the driver 282 is advanced axially inwardly, the tapered walls 277, 282 interact to drive the end 272 of the protuberance 257 radially outward to create a tight fit between the protuberance 257 and the bore B of a rim R. Driver 281 is mounted on a shaft 284 that extends narrowly through the bore 293 of body 270. The biasing assembly, generally indicated by the numeral 285, is located subjacent to the protuberance 257 and acts on a flange 289 formed on the shaft 284 to urge the driver 281 inward. To release the driver 281, the spring force of the spring 287 must be overcome, as by mechanical means or fluid pressure, as described in the previous embodiment. In the example depicted in FIG. 6, the spring 287 is shown in an extended condition with air pressure applied to drive the flange 289 against a stop 295 formed in the interior of body 270. As will be appreciated, if the pressure is released, the spring force urges the driver downward. Consequently, if a loss in pressure occurs in the tire uniformity machine 10, the chuck assembly 250, generally fails to a safe condition, where the interference fit between the bore B and the protuberance 257 is maintained.

Figure 7:
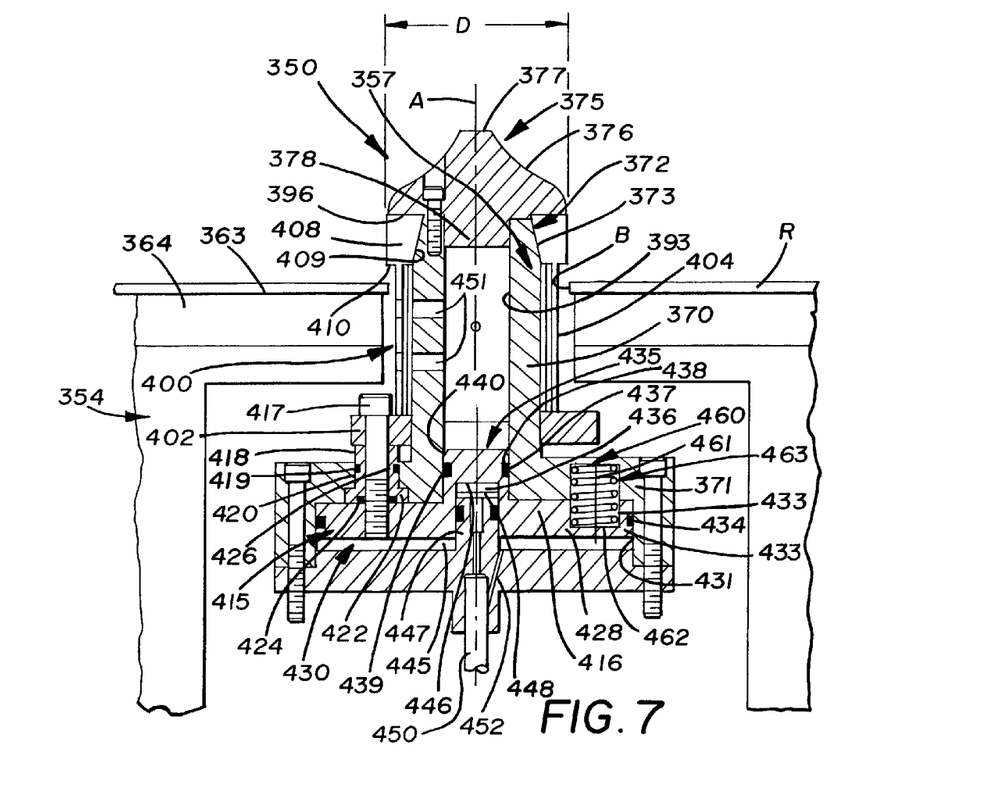
FIG. 7 is an enlarged partially sectioned view similar to FIG. 4 depicting a fourth alternative embodiment of a chucking assembly according to the concepts of the present invention.
Figure 8:
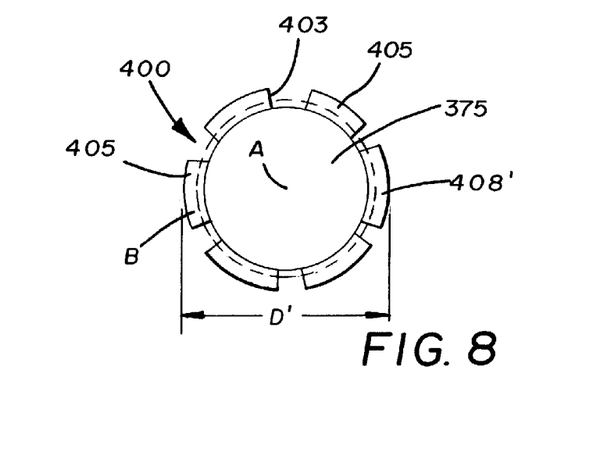
FIG. 8 is a partially schematic top plan view tips of the fingers of the chuck assembly depicted in FIG. 7, showing radial expansion of the tips from an unlocked position schematically depicted in broken lines to a locked position shown in solid lines.

A fourth alternative chuck assembly is depicted in FIGS. 7 and 8, generally indicated by the numeral 350. Chuck assembly 350 incorporates an expandable collet assembly, generally indicated by the numeral 400 and described in more detail below, to help secure the rim R to the chuck assembly 350. Chuck assembly 350 shares components with the previous embodiments, and, as before, like numbers will be used to refer to like components.

The second chuck element 354 is depicted in FIG. 7, and includes a protuberance 357 projecting axially beyond the end 363 upon which the rim R rests. Protuberance 357 includes a generally cylindrical body 370 extending axially outward from a base 371 that is secured to the second chuck assembly 354, as by fasteners. The axially extremity 372 opposite base 371 has an outer surface 373 that tapers inwardly away from the base 371 or upward in the example shown. A cone assembly 375 is attached at the end 372 of protuberance 357 and may include a tang 378 that extends axially into the bore 393 of the body 370. As in previous embodiments, the cone assembly 375 has a tapered outer surface 376 extending radially outward from a tip 377 to facilitate locating of the bore B of rim R on the protuberance 357. In the example shown, cone assembly 375 extends radially outward of the end 372 of protuberance 357 defining an annular shoulder 396.

A collet assembly, generally indicated by the numeral 400, fits over the body 370 of protuberance 357 and includes an annular base 402 and generally cylindrical body 404 extending axially outward from the base 402 toward cone assembly 375. The body 404 may be made somewhat flexible, as by controlling the thickness of the material, or by dividing the body into segments or fingers 405 (FIG. 8). In the example depicted in FIGS. 7 and 8, the body 402 is segmented into plural fingers 405 divided by axial grooves 403 that extend along at least a portion of the length of the body 404. The fingers 405 have a relatively thin wall thickness in relation to the base 402 of collet assembly 400 to provide additional flexibility. The tips 408 of fingers 405 may have additional thickness for load bearing purposes. In the example shown, the tips 408 have a greater thickness than the fingers 405 and include a sloped interior surface 409 that mates with the tapered surface 373 at the end 372 of protuberance 357. The mating of the surfaces 373, 409 allows control of the effective diameter D of the protuberance 357 by axially moving the collet assembly 400 relative to body 370. In the example shown, movement of the collet assembly 400 toward the base 371 of body 370 causes tips 408 of fingers 405 to expand radially outward as the sloped interior surface 409 of tips 408 are forced radially outward by the expanding diameter of the end 372 of body 370 to assume a lock position 408', where collet assembly 400 attains a greater effective diameter D' (FIG. 8). Conversely, when the collet 400 travels away from the body, the tips 408 of fingers 405 will retract radially inward and in accordance with the decreasing diameter of the end 372. In operation, the collet assembly 400 may be expanded after the protuberance 357 is inserted through bore B of the rim R to ensure a tight fit between the protuberance 357 and bore B. Initially, the tips 408 of fingers 405 are in a release position shown in FIG. 7, where the effective diameter D is less than or equal to the diameter of bore B, the collet assembly 400 is drawn inward causing the tips 408 to expand radially along the surface 373 of protuberance 357. This expansion effects contact between the fingers 405 and rim R generating a radial grasping force or interference fit between the collet assembly 400 and rim R. To provide a positive stop to axial movement of the rim R, the tips 408 of fingers 405 may be provided with a shoulder 410 extending radially outward of the body 404 of collet assembly 400. In this example, the tips 408 would be inserted through the bore B and extend axially beyond the rim R such that expansion of the tips 408 would cause the shoulder 410 extend radially outward of bore B (FIG. 8) to overlap a portion of the rim R.

Control of the movement of the collet assembly 400 may be performed by an actuator assembly 415, which may be a mechanical element, such as a rod, cam, rack and pinion or a linear actuator. In the example shown, assembly 415 includes a fluid controlled actuator 416, which is generally in the form of a diaphragm or plunger. Plunger 416 is attached to the base 402 of collet assembly 400, as by a fastener 417 that is slidably received within a sleeve 418 extending through the base 371 of protuberance 357. To accommodate sliding of fastener 417 and allow th collet assembly 400 to move toward base 371, the sleeve 418 may be made of an elastic material that can be suitably compressed. Alternatively the sleeve 418 may be made slidable within base 371 and fasten to fastener 417, such that the sleeve 418 would move with collet assembly 400. A first seal 419 may be provided on the exterior of the sleeve 418 to prevent any fluid from leaking around the exterior surface 420 of sleeve 418. Sleeve 418 may be provided with a flange 422 that extends radially outward of the exterior surface 420 of the sleeve 418 to further reduce leakage and to help the sleeve 418 to resist axial loads caused by the applied pressures. A second seal 424 may be located within the flange 422 and adjacent to the fastener 417 and a chamber 430 formed below the base 371 of protuberance 357. In the example shown in FIG. 7, second seal 424 is in sealing contact with the fastener 417 to prevent any leakage through the bore 426 of sleeve 418.

The plunger 416 generally includes a plunger base 428 having a radially dimension substantially equal to the chamber 430 defined beneath the base 371 of protuberance 357 and the sidewall 431 of the second chuck element 354. Plunger base 428 may be provided with rounded or sloped shoulders 433 to facilitate its axially movement within the chamber 430. A plunger seal 434 may be located axially between the shoulders 433 and extending around the circumference of the plunger base 428 to provide sealing engagement between the plunger base 428 and the chamber wall 431. A tang, generally indicated by the numeral 435 may extend axially upward from the central portion 436 of plunger base 428 and be sized to be received within the bore 393 defined within body 370 of protuberance 357. Tang 435 acts to properly locate the plunger 416 and maintain its position throughout the axial movement of the plunger 416. A seal 437 may be received within a circumferential recess 438 formed on the tang 435 near its outer axial extremity. To facilitate movement of the tang 435, the tang 435 may be provided with a rounded or sloped shoulder 440.

Chamber 430 is sized to have an axial dimension greater than that of the plunger base 428 to allow axial movement thereof. As will appreciated, the axial dimension of the chamber 430 may be used to limit the amount of axial movement of the collet assembly 400. In the example shown in FIG. 7, the collet assembly is depicted in a disengaged position with pressure being applied to the plunger assembly 415. In this way, any loss in pressure within the tire uniformity machine 10 that might result in a loss of pressure against plunger assembly 415, would cause the collet assembly 400 to fail to a safe position i.e. one where the plunger assembly 415 moves axially inward drawing the fingers 405 axially inward over surface 373 causing the fingers 405 to expand and grasp the bore B of the rim R.

It will be appreciated that fluid pressure may be applied to the underside 445 of plunger assembly 415 to urge the plunger assembly 415 outward. To reduce the quantity of fluid necessary to effect actuation of the plunger assembly 415, a recess 446 may be formed in the plunger assembly 415. In the example shown, recess 446 is centrally located and extends into tang portion 435. Recess 446 is sized to fit over and slidably receive a plug 447 that extends upwardly into chamber 430 and acts to guide movement of plunger assembly 415 by generally limiting the plunger assembly 415 to axial movement. Plug 447 may also be used to locate tang 435 relative to bore 493. As can be seen in FIG. 7, the volume of the cavity 448 formed between recess 446 and plug 447 is small, and thus, only a small quantity of fluid is necessary to develop sufficient pressure to actuate plunger assembly 415. Similar to previously described members associated with the plunger assembly 415, plug 447 is sealed within recess 446 by an O-ring or similar seal.

Fluid necessary to actuate plunger assembly 415 is provided from a suitable supply (not shown) through passage 450. To avoid vacuum forces one or more vents 451 may be provided on either axial side of plunger assembly 415. For example, first passage may extend through body 371 and vent to the atmosphere. A second bleed passage 452 may extend into the chamber 430 beneath plunger assembly 415 and vent to passage 450.

A biasing assembly 460 may be provided to further urge the collet assembly 400 to a safe position. For example, a spring 461 may be seated within a first recess 463 formed in the base 371 of protuberance 357 and a second recess 462 formed in the plunger base 428. In the disengaged position, shown in FIG. 7, the spring 447 is compressed by pressure applied to the plunger base 428 sufficient to overcome the biasing force of the spring 461 that tends to urge the plunger base 428 away from the base 371 of the protuberance 357. As discussed above once pressure is released from the plunger 428, the spring 461 will urge the plunger base 428 and collet assembly 400 downward causing the fingers 405 to expand and grasp the bore B of rim R.

In operation, the entrance conveyor 16 transports the wheel W until the wheel W is detected by position sensor 25, which stops operation of the conveyor assembly 15. The tire uniformity machine 10 is then ready to begin and auto cycle procedure. To begin the cycle, an operator would press a button on controller C to begin the automatic sequences. As will be appreciated, the reactivation of the machine 10 by the operator may be omitted and the automatic testing sequence carried out as the tire is transported into the machine proper 14. In any event, once the autocycle process begins, the entrance conveyor 16 moves the wheel W through the centering assembly 20, which moves the wheel W as necessary to align it with the center line of the conveyor assembly 15. After passing the centering assembly 20, the wheel W moves on to the center conveyor 30, where it is detected by a second position sensor 28. Detection of the wheel W by the second sensor commences a timer that records the time that it takes the wheel to pass a second sensor. This recorded time is used to calculate the conveyor running time required to stop the wheel W over the chuck assembly 50. Actuators 31 are activated to lower the center conveyor 30 positioning the wheel W on the chuck assembly 50. The center conveyor 30 continues to move until first proximity switch 45 is activated verifying the center conveyor position. A second solenoid valve 49 is energized to expand the protuberance 57, 157, 257, 357 or collet assembly 400 in the bore B of the wheel W to locate the wheel W on the center of the chuck assembly 50, 150, 250, 350. A first pressure switch 91 is activated to verify to the controller that the wheel W is in position on the chuck assembly 50, 150, 250, 350. Solenoid valve 49 is activated to extend cylinder 93 until the first chuck element 53 contacts the wheel W firmly clamping it to the second chuck element 54. At the same time a third pressure switch 95 is activated to verify to the controller that the wheel W is ready for testing.

At this point, in a process well known to those skilled in the art, testing of the tire T begins, for example, by commencing spindle rotation to cause the tire T to rotate, contacting the rotating tire T with load wheel assembly 96, and obtaining and recording various information from load cells associated with the load wheel assembly 96. After such data is obtained, the load wheel assembly 96 retracts and the spindle stops. After testing, solenoid valve 49 is shifted retracting cylinder 93. Proximity switch 94 is activated to verify full retraction of the cylinder 93. Then, solenoid valve 48 is shifted retracting the protuberance 57, 157, 257, or collet assembly 400 to release the bore B. Second pressure switch 92 is activated to verify retraction of the protuberance or collet. Solenoid valve 48 is then shifted to raise the center conveyor 30 which lifts the wheel from the chuck assembly 50. The center conveyor 30 continues to rise until the third proximity switch 46 is activated to verify the raised position. At this point, the center conveyor 30 and exit conveyor 99 are activated to transport the wheel W out of the machine proper 14. A third position sensor 100 verifies the exit of the wheel W from the machine 10 to prepare for the next auto cycle associated within the coming wheel W.

While a full and complete description of the invention has been set forth in accordance with the dictates of the Patent Statutes, it should be understood that modifications can be resorted to without departing from the spirit hereof or the scope of the appended Claims.

What is claimed is:

1. A tire uniformity machine for testing a wheel that includes a tire mounted on a rim having a central bore, the tire uniformity machine comprising: a frame defining a machine proper for receiving the wheel; a chuck assembly adapted to hold the wheel during testing, said chuck assembly including a protuberance insertably received within the central bore; wherein a portion of said protuberance is adapted to expand radially outwardly within the central bore to fix the rim to said chuck assembly, wherein said protuberance includes a collet having at least one flexible finger adapted to expand radially outward within the central bore wherein said finger includes a thickened portion adapted to extend axially beyond the rim upon insertion of the protuberance through the bore;

said thickened portion having a shoulder that extends radially outward from said finger, where radial expansion of the finger causes said shoulder to overlap a portion of the rim.

2. A tire uniformity machine for testing a wheel that includes a tire mounted on a rim having a central bore, the tire uniformity machine comprising: a frame defining a machine proper for receiving the wheel; a chuck assembly adapted to hold the wheel during testing, said chuck assembly including a protuberance insertably received within the central bore; wherein a portion of said protuberance is adapted to expand radially outwardly within the central bore to fix the rim to said chuck assembly, wherein said protuberance includes a collet having at least one flexible finger adapted to expand radially outward within the central bore, wherein said collet is axially moveable to draw said finger over a guide surface to effect radial displacement of said finger; and     a biasing assembly adapted to urge said collet toward a locked position where said guide surface displaces said finger radially outward to contact the central bore of the rim, wherein said biasing assembly includes a spring in operative contact with said collet wherein said biasing assembly induces a plunger sealingly received within a chamber defined in the chuck assembly axially inward of the collet, said collet being axially coupled to said plunger such that said collet and said plunger travel together in the axial direction; wherein said spring contacts said plunger at one end and said chuck assembly at an opposite end.

3. The tire uniformity machine of claim 2 further comprising a recess formed in the chuck element beneath the collet and a plug extending axially outward from said plunger, wherein said plunger is received within said recess to guide axial movement of said plunger.

4. A tire uniformity machine for testing a wheel that includes a tire mounted on a rim having a central bore, the tire uniformity machine comprising: a frame defining a machine proper for receiving the wheel; a chuck assembly adapted to hold the wheel during testing, said chuck assembly including a protuberance insertably received within the central bore; wherein a portion of said protuberance is adapted to expand radially outwardly within the central bore to fix the rim to said chuck assembly, wherein said protuberance includes a collet having at least one flexible finger adapted to expand radially outward within the central bore, wherein said collet is axially moveable to draw said finger over a guide surface to effect radial displacement of said finger; and     a biasing assembly adapted to urge said collet toward a locked position where said guide surface displaces said finger radially outward to contact the central bore of the rim, wherein said biasing assembly includes a spring in operative contact with said collet; and a passage in communication with a surface of said plunger opposite of said spring, said passage adapted to deliver fluid against said surface to selectively urge said collet opposite the urging of said spring to retract said finger from said locked position.

5. A chuck assembly adapted to hold a wheel having a central bore, said chuck assembly including: a protuberance insertably received within said central bore;

wherein a portion of said protuberance is adapted to expand radially outwardly within said bore to fix the wheel to said chuck assembly;

wherein said protuberance includes a collet having at least one flexible finger adapted to expand radially outwardly within said bore; and     wherein said finger includes a thickened portion adapted to extend axially beyond the wheel upon insertion of the protuberance through the bore;

said thickened portion having a shoulder that extends radially outward from said finger, where radial expansion of said finger causes said shoulder to overlap a portion of the wheel.

6. A chuck assembly adapted to hold a wheel having a central bore, said chuck assembly comprising: a protuberance insertably received within said central bore;

wherein said protuberance is adapted to expand radially outwardly within said bore to fix the rim to said chuck assembly;

wherein the protuberance includes a collet having at least one flexible finger adapted to expand radially outward within said central bore;

wherein said collet is axially movable to draw said at least one finger over a guide surface to effect radial displacement of said finger; a biasing assembly adapted to urge said collet toward a locked position where said guide surface displaces said finger radially outward to contact said central bore, said biasing assembly including a spring in operative contact with said collet;

wherein said biasing assembly includes a plunger sealingly received; within a chamber defined in the chuck assembly axially inward of said collet, said collet being axially coupled to said plunger such that said collet and said plunger travel together in the axial direction;

wherein said spring contacts said plunger at one end and said assembly at an opposite end.

7. A chuck adapted to hold a wheel having a central bore, said chuck assembly including: a protuberance insertably received within the central bore;

wherein a portion of said protuberance is adapted to expand radially outwardly within the central bore to fix the rim to the chuck assembly;

wherin said protuberance includes a collet having at least one flexible finger adapted to expand radially outward within the central bore;

wherein said collet is axially moveable to draw said finger over a guide surface to effect radial displacement of said finger; and     a biasing assembly adapted to urge said collet toward a locked position where said guide surface displaces said finger radially outward to contact the central bore of the rim;

wherein said biasing assembly includes a spring in operative contact with said collet; and     a passage in communication with a surface of said plunger opposite of said spring, said passage adapted to deliver fluid against said surface to selectively urge said collet opposite the urging of said spring to retract said finger from said locked position.

* * * * *